[19] United States Patent
Hill

[11] Patent Number: 4,542,456
[45] Date of Patent: Sep. 17, 1985

[54] METHOD AND APPARATUS FOR PERFORMING RANGE CHECKS

[75] Inventor: Dwight D. Hill, Holmdel, N.J.

[73] Assignee: AT&T Bell Laboratories, Murray Hill, N.J.

[21] Appl. No.: 372,482

[22] Filed: Apr. 28, 1982

[51] Int. Cl.[4] .............................................. G06F 7/02
[52] U.S. Cl. .................................................... 364/200
[58] Field of Search ............... 364/200, 900, 153, 154, 364/184, 185, 186; 371/16, 19

[56] References Cited

U.S. PATENT DOCUMENTS

| | | | |
|---|---|---|---|
| 4,169,290 | 9/1979 | Reed et al. | 364/900 |
| 4,215,400 | 9/1980 | Denko | 364/200 |
| 4,338,660 | 7/1982 | Kelley et al. | 364/200 |
| 4,356,546 | 10/1982 | Whiteside et al. | 364/200 |

OTHER PUBLICATIONS

Dwight D. Hill, "A Hardware Mechanism for Supporting Range Checks", *Computer Architecture News*, pp. 15–20, Jun. 15, 1981.
"Instruction Set Architecture for the Military Computer Family," p. 89, MIL-STD-1862, May 28, 1980.
C. Mead and L. Conway, Introduction to VLSI Systems, pp. 145–217, (1980).
"A Proposed Standard for Binary Floating-Point Arithmetic," *Computer*, pp. 51–62, Mar. 1981.

*Primary Examiner*—Thomas M. Heckler
*Attorney, Agent, or Firm*—David Volejnicek

[57] ABSTRACT

Disclosed is a method and an apparatus for range checking a value in a programmable system. An instruction prefix LDRNG enables the checking of a value against one or both limits of a range of values. The value is calculated as part of the execution of a primary instruction which is any suitable instruction, such as ADD, MOVE, STORE, etc., that directly follows the prefix. During the execution of the primary instruction the range check is performed, and an exception is taken without completing execution of the primary instruction if the value does not lie within the range.

30 Claims, 8 Drawing Figures

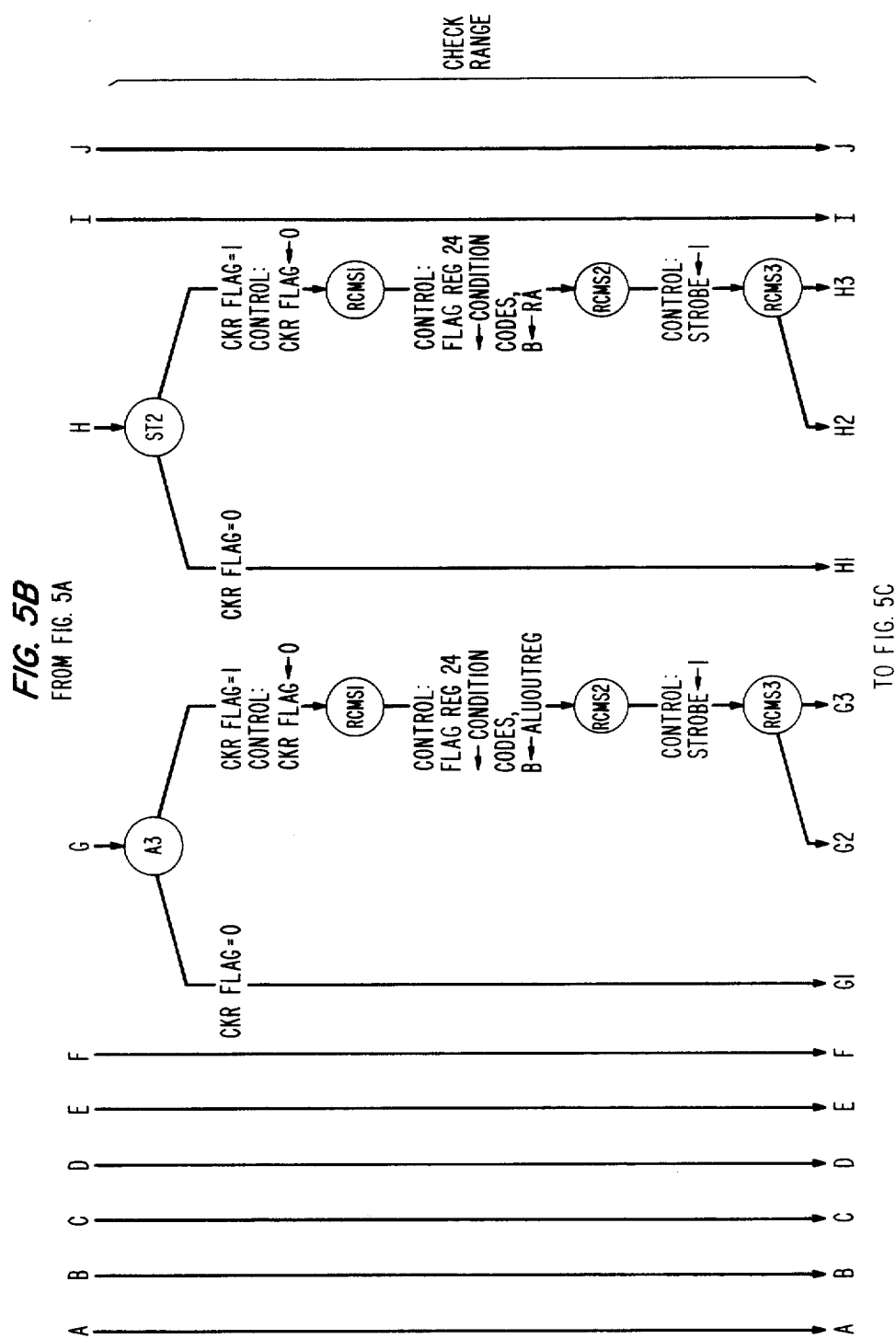

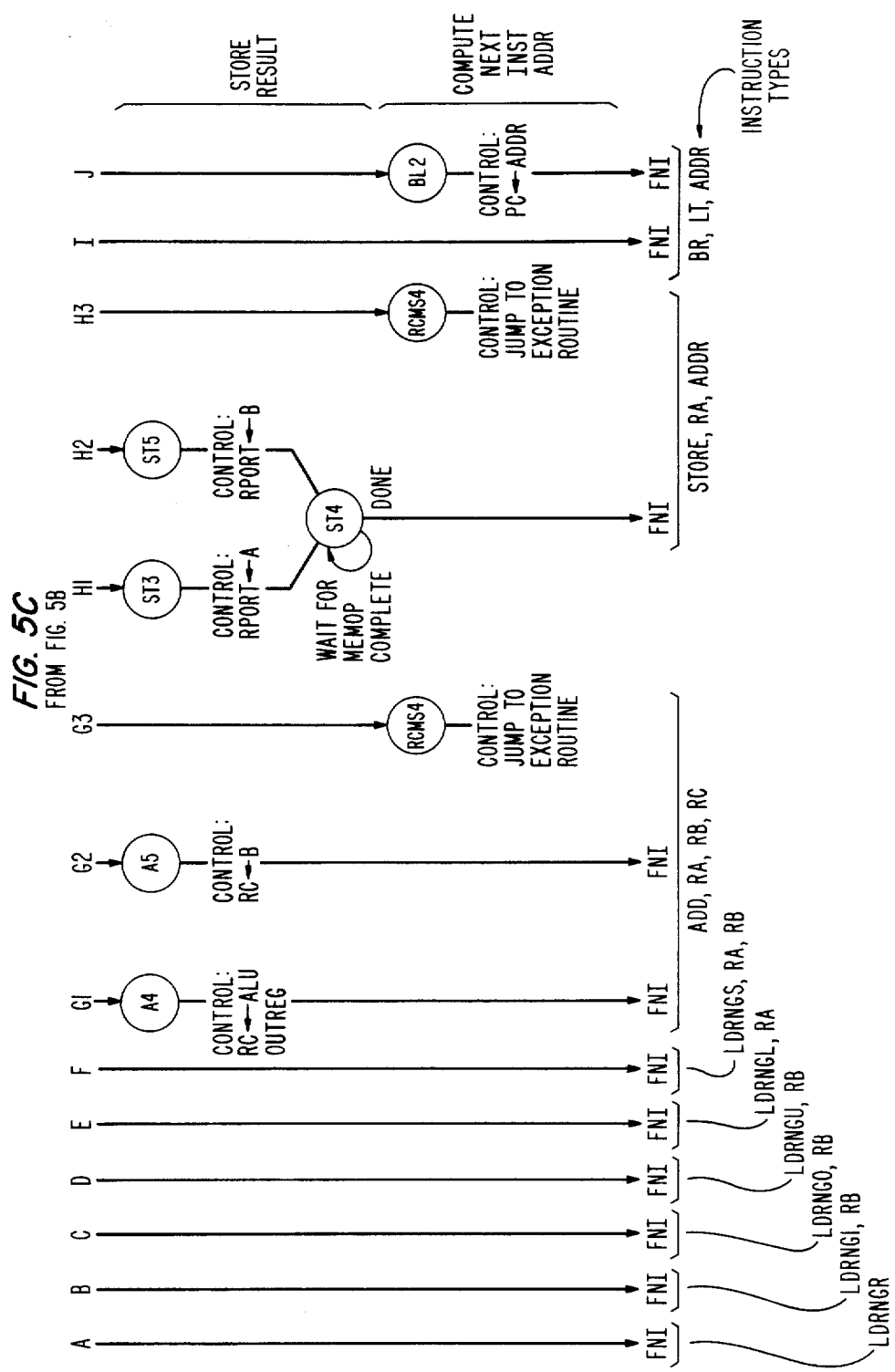

METHOD AND APPARATUS FOR PERFORMING RANGE CHECKS

TECHNICAL FIELD

This invention relates to programmable systems, and in particular to checking for out-of-bounds values in digital computer systems.

BACKGROUND OF THE INVENTION

Modern programming languages such as PASCAL, MESA, and ADA allow computer programmers to specify in their programs the exact range of values that are acceptable for a given variable. For example, a variable denoting the day-of-month may have a specified range from 1 to 31, and values outside of this range will be considered non-allowed values for this variable. Therefore, to meet the specifications of the language, every new assignment of a value to a ranged variable must be checked to ensure that the new value lies within the acceptable range.

The term "value" refers herein to any numerical quantity. It can be represented in various ways, for example as the result of an arithmetic or a logical operation, as the contents of a storage location, as a given constant quantity, or as the state of some device.

The language implementations generally attempt to catch as many "out of range" errors as possible at the time of converting a computer program from the higher level languages in which the program is written to the machine level code which the computer is capable of executing. However, whenever expressions, such as equations for determining the value of a variable, are evolved that must be evaluated during program execution and not during program conversion, extra machine level code must be generated that will cause the computer to check the variable's values during program execution to guarantee that new values are within the specified range. These requirements greatly complicate the operation, and hence the structure, of the compiler, which is a program that carries out the pre-execution conversion of the higher level language program into machine level code. The semantics of these checks vary from language to language and thus the compiler of each language must be differently structured to accommodate the particular semantics. However, a common requirement of range checking is that the expression be evaluated and the results be compared to the range before they are stored in the location assigned to the variable.

Conventional computers make little provision for supporting the range checks. As a result they must perform the checks is software, and the logic sequence that they must follow to perform range checks is fairly complex. In computing a value for a ranged variable, a conventional machine must first allocate a temporary storage space. This is generally a register in the machine's central processing unit, and it may necessitate storing the register's prior contents elsewhere. The machine then performs the computation, and stores the result in the temporary storage space. Next the contents of the temporary storage are compared against the low limit of the range. If the contents are less than the low limit, a branch must be performed to an error handling routine. If the contents are greater than the low limit, the contents of the temporary storage are compared against the high limit of the range. If the contents are greater than the high limit, a branch to an error handling routine must again be performed. Finally, if the contents of the temporary storage lie within the range, the operation is completed by storing the contents of the temporary storage in the location assigned to the variable.

Because the above-described process is complex and because it is done in software, the range checking operation is very slow. Hence it has a high overhead cost associated with it. Especially detrimental to system performance in terms of overhead is the allocation and explicit referencing of the temporary storage of the computed value. Additionally, the software required to perform the range check consumes a great deal of memory storage.

Furthermore, this process does not permit memory-to-memory instructions to be utilized in conjunction with range checking. Memory-to-memory instructions obtain operands from the memory and store results in the memory. The above-described range checking process, however, requires that the calculated result be stored in a temporary location, and be moved to a permanent memory location only after the range check has been performed. Hence the range checking process results in a proliferation of instructions and an underutilization of the capability of many machines, with a resulting increase in system overhead.

A few modern instruction sets, such as the military standard instruction set described in *Instruction Set Architecture for the Military Computer Family*, MIL-STD-1862 (May 28, 1980), provide a single instruction to test the contents of the temporary storage against the upper and lower limits of the range and to take an exception if the contents are out of range. While this effectively compresses the test-and-branch steps described above into one instruction, the major overhead of allocating the temporary storage and of otherwise specifying its location is unaffected thereby. Furthermore, such an instruction still does not permit memory to memory instructions to be combined with range checking. The advantage achieved with the single instruction is therefore limited.

SUMMARY OF THE INVENTION

The present invention is directed to alleviating these and other disadvantages of the prior art range checking schemes. According to this invention, range checking of a value against one or both limits of a range of values is enabled in a programmable system by a first instruction, referred to herein as an instruction prefix. The value to be range checked is obtained as part of the execution of a second instruction, referred to herein as a primary instruction, which is subsequent to the first instruction. The obtained value is compared with one or both of the range limits, and an indication is generated when the value lies outside of the range.

Preferably, execution of the second instruction is caused to continue when the value lies within the range. The first instruction is selectively provided to the system, and preferably execution of the second instruction is also caused to continue when range checking is not enabled. Advantageously, when an indication is generated that the value lies outside of the range, execution of the second instruction is interrupted and error handling means are activated.

This range checking scheme provides numerous advantages over the prior art range checking schemes. Because the program need include only one additional instruction, the prefix, to perform a range check, range checking is fast and efficient, code length is conserved, and program memory space is conserved. Because temporary storage need not be allocated by the compiler, compiler design is simplified, and the overhead of allocating a register to serve as temporary storage and of freeing the register to serve this function when all registers are occupied is eliminated. Modification of instructions to store results which are to be range checked in the temporary location is no longer required, and memory-to-memory instructions can be executed directly. Hardware is simplified because a request for range checking need not specify to the machine what type, or length, of data is being worked with—this information is provided by the instruction whose result is to be range checked—and thus the request for range checking may be made by a single instruction for all types of data. Also, the scheme may easily be integrated into an otherwise standard programmable system. Additionally, instructions requesting a range check may be selectively added to or deleted from a program at any time without affecting the rest of the program. Moreover, this scheme is compatible with pipelined architectures of programmable systems.

These and other advantages of the present invention will become more apparent during the following description of an illustrative embodiment of the invention considered together with the drawing.

BRIEF DESCRIPTION OF THE DRAWING

FIGS. 5A–5C are a partial state diagram of the controller of FIG. 1; and

DETAILED DESCRIPTION

Processor

Turning now to the figures, there is shown an illustrative embodiment of the present invention. The invention is presented as a modification to a conventional stored-program, general-purpose computer, such as the OM2 processor disclosed in C. Mead and L. Conway, *Introduction to VLSI Systems*, Chs. 5 and 6 (Addison-Wesley Pub. Co., 1980), hereafter referred to as Mead and Conway.

Figure 1:
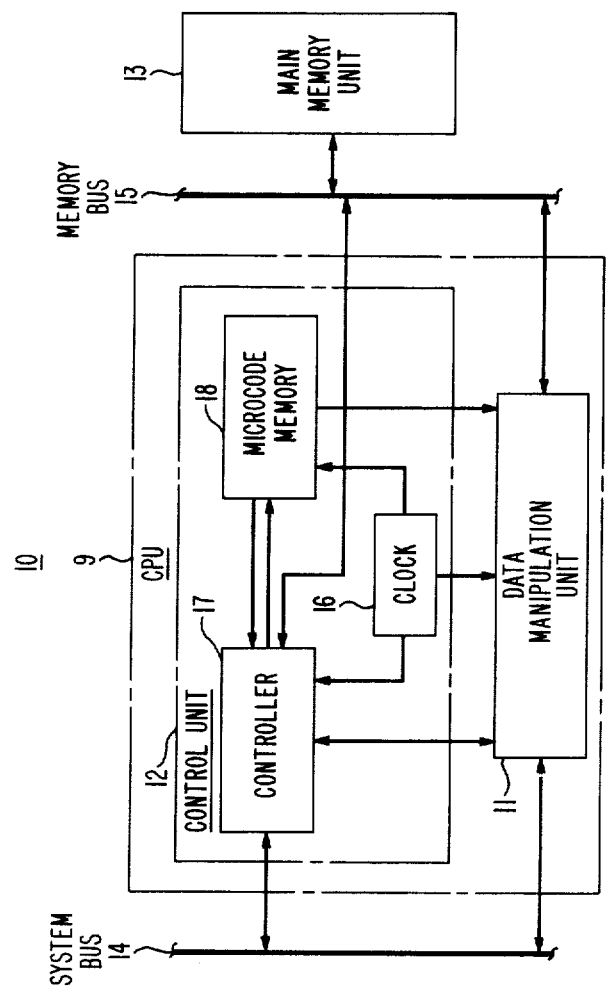
FIG. 1 is a block diagram of a processor that includes an illustrative embodiment of this invention.

FIG. 1 shows a general block diagram of an OM2 processor 10. Briefly described, the processor 10 includes a central processing unit (CPU) 9 which performs the processing functions for the processor 10, a main memory 13 which stores the program and data for use by the processor 10, and a pair of buses 14, 15 which provide communication paths for the processor 10.

The CPU 9 is comprised of a data manipulation unit 11 and a control unit 12. The unit 11 performs most of the data manipulation functions, such as arithmetic and logic operations and temporary data storage, for the processor 10. The unit 11 is discussed in greater detail below in conjunction with FIGS. 2–4.

The unit 11 performs operations as directed by sequences of control microinstructions generated by the control unit 12. The control microinstructions provided to the manipulation unit 11 enable data paths and select the appropriate arithmetic, logic, and data storage functions. The microinstructions are stored in a conventional microcode memory 18 in the control unit 12, from where they are fetched using addresses generated by a controller 17, also included in the control unit 12. The controller 17 is discussed in greater detail in conjunction with FIG. 5.

The control unit 12 also includes a clock 16 that generates two-phase clock signals which are needed by the processor 10 to sequence and synchronize the operation of its various elements.

For the receipt and output of data, the manipulation unit 11 is connected to the two buses: a system bus 14 and a memory bus 15. The system bus 14 interconnects the processor 10 with other OM2 processors (not shown) that may be connected thereto to form a multiprocessor system. The bus 14 provides a data communication path between the manipulation units within the system, and a communication path for instructions and other control signals between the control units within the system.

The memory bus 15 provides a communication path between the CPU 9 and the main memory unit 13. The bus 15 may also provide a communication path to input and output devices (not shown), either directly or through the main memory unit 13. The data manipulation unit 11 is connected to the bus 15 for sending data to and receiving data from the unit 13. The controller 17 of the control unit 12 is also connected to the main memory unit 13 by the memory bus 15 for obtaining therethrough program instructions which are stored in the unit 13.

Data Manipulation Unit

Figure 2:
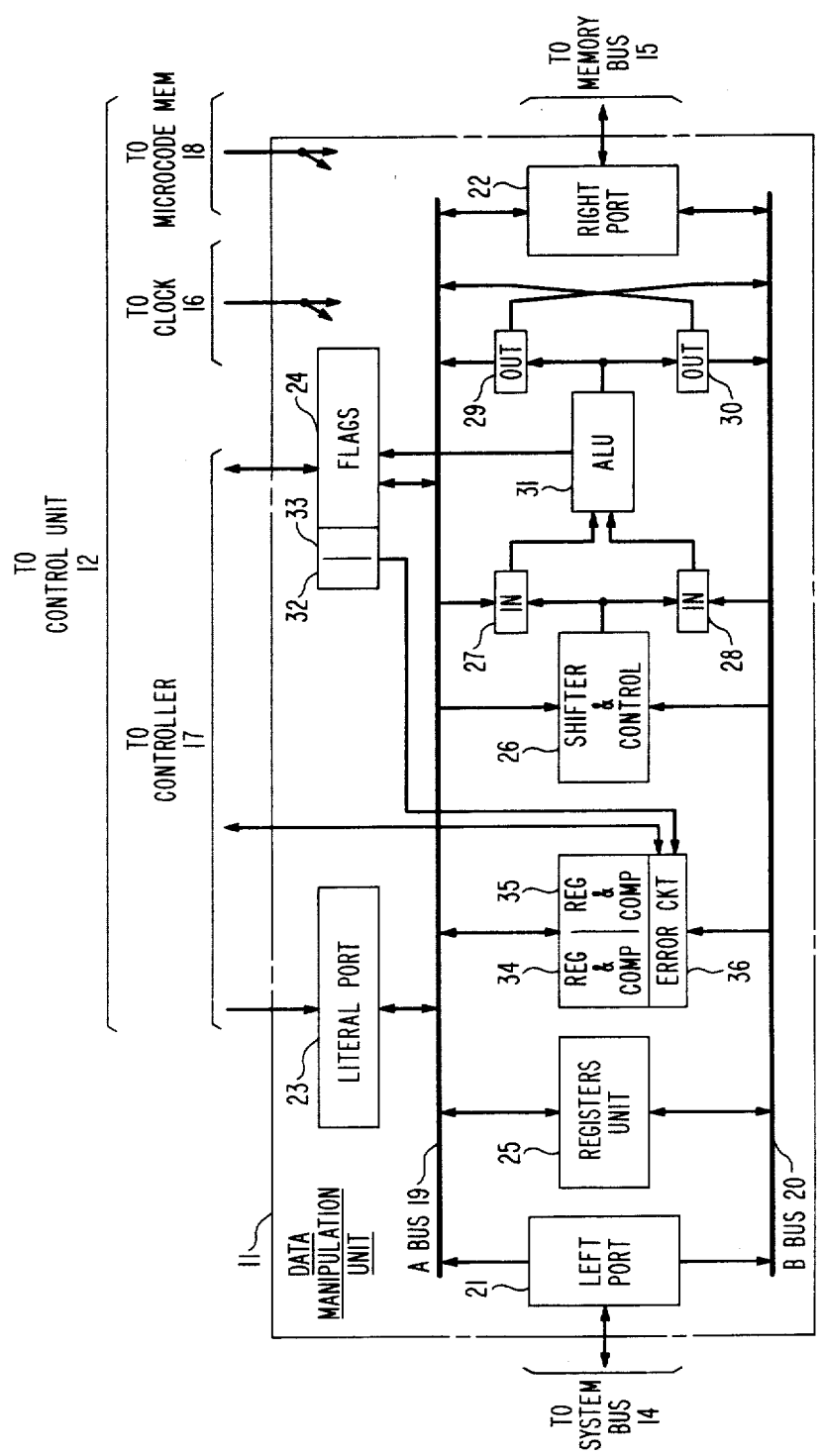
FIG. 2 is a block diagram of the data manipulation unit of FIG. 1.

Turning now to FIG. 2, there is shown a block diagram of the data manipulation unit 11 of FIG. 1. The unit 11 is comprised of an OM2 data path circuit, whose structure and function are detailed in Ch. 5 of Mead and Conway, supra. Therefore only a cursory overview of the unit 11 is given below to provide a setting for the understanding of this invention.

The unit 11 has two internal data buses, an A bus 19 and B bus 20, both of which communicate with all major blocks of the unit 11. At each end both buses 19 and 20 are connected to one of a pair of conventional ports 21 and 22. The left port 21 interconnects the buses 19 and 20 with the system bus 14, while the right port 22 interconnects the buses 19 and 20 with the data bus 15. The ports 21 and 22 communicate between the unit 11 and the outside world. The ports 21 and 22 are tri-state gates with either internal or external control.

A conventional registers unit 25 is connected to both the A bus 19 and the B bus 20. The registers unit 25 comprises 16 static dual port registers. Any one of the 16 registers may source either or both of the buses 19 and 20, and any one of the 16 registers may be the destination for either bus 19 or 20.

A word-length shifter register with associated control 26 is also connected to both buses 19 and 20. The shifter register and control 26 concatenates the A bus 19 and the B bus 20, resulting in a double word, with bus A being its more significant half. A shift constant then selects the bit position at which a word-length output window starts.

The output of the shifter register and control 26 is connected to the inputs of a pair of latch input registers 27 and 28. An input of the register 27 is also connected to the A bus 19, while an input of the register 28 is connected to the B bus 20. The registers 27 and 28 hold the input variables to an arithmetic and logic unit (ALU) 31. The latch register 27 may be loaded from the A bus 19 or the output of the shifter and control 26. While the latch register 28 may be loaded from the B bus 20 or the output of the shifter and control 26.

The ALU 31 is connected to the outputs of the latch registers 27 and 28 and operates on the data that is contained therein. The ALU 31 is a conventional unit. The output of the ALU 31 is connected to inputs of a pair of latch output registers 29 and 30, whose outputs are connected to both buses 19 and 20. Thus either register 29 or 30 may be used to source either bus 19 or 20.

The ALU 31 includes flags, such as carry-out, overflow, carry-in to the most significant bit, less than, less than or equal to, and higher. The ALU 31 can load the flags into and store them in a 16-bit flag register 24 to which it is connected. The register 24 is also connected to the A bus 19 and can be a source or a destination for the bus 19. The register 24 is furthermore connected for input and output to the control unit 12.

To send data, other than the flag bit, between the manipulation unit 11 and the controller 17, the manipulation unit 11 includes a 16 bit literal port 23. The port 23 interconnects the A bus 19 with the controller 17, and acts as a source or destination for the bus 19. When the literal port 23 is being used, standard bus operations of the manipulation unit 11 are suspended.

Appropriate control leads from the microcode memory 18 connect to the various portions of the manipulation unit 11 in a conventional manner, primarily to control the interfacing of these portions to the buses 19 and 20.

Range-Checking Hardware

In addition to these conventional elements, the data manipulation unit 11 includes a pair of registers and comparators 34 and 35. The registers and comparators 34, 35 can be loaded and read out via the A bus 19. They are also adapted to read the contents of the B bus 20. The register portion of the register and comparator 34 is used for holding the lower limit of a range of values, while the register portion of the register and comparator 35 is used for holding the upper limit of the range of values. The comparator portions of the registers and comparators 34 and 35 compare the contents of the associated register portions with the contents of the B bus 20. The basic design of these registers and comparator is akin to the registers of the registers unit 25, with additional circuitry to perform the comparison function. The structure of the registers and comparators 34, 35 is shown in FIG. 3.

Two flag bits, designated by the numbers 32 and 33 in FIG. 2, are also added to the flags register 24. The one flag bit 32 is used to indicate whether a check of a value against the low limit of the range of values is enabled, and the other flag bit 33 is used to indicate whether a check of a value against the high limit of the range of values is enabled. The flag bits 32 and 33 are made part of the flags register 24 and are built using the same technology as the other bits in that register 24. Like other flag bits, the bits 32 and 33 may be set and cleared by the controller 17.

The bits 32 and 33 provide control inputs to a error circuit 36 which is associated with the registers and comparators 34 and 35. The circuit 36 generates an error signal to the controller 17 when the comparators of the registers and comparators 34 and 35 indicate that a value being compared against the range limits is out of range. The circuit 36 and flag bits 32 and 33 are diagramed in FIG. 4.

Figure 3:
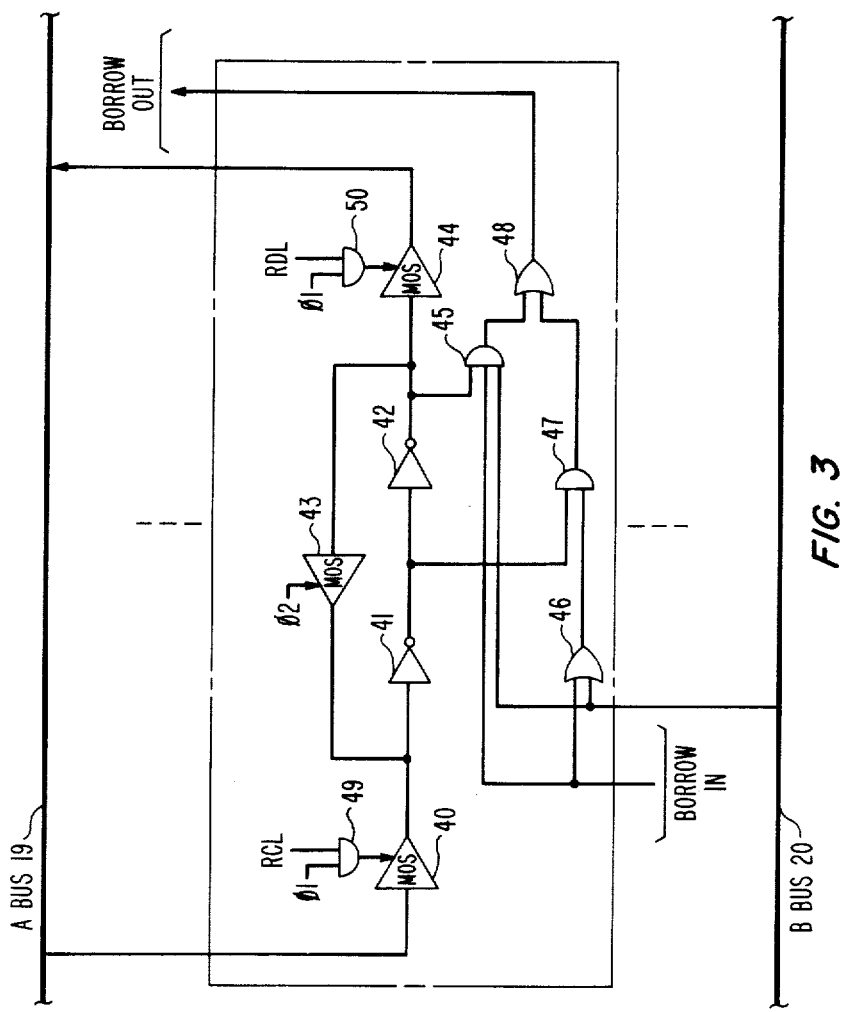
FIG. 3 is a logic diagram of one bit of the registers and comparators of FIG. 2.

Turning now to FIG. 3, there is shown a logic diagram of only one bit position of a register and comparator 34, 35. The logic there shown is substantially duplicated for each bit position of the registers and comparators 34 and 35.

A bit value is loaded into the register and comparator bit shown in FIG. 3 from the A bus 19 through a metal oxide semiconductor (MOS) transmission gate 40. The input of the gate 40 is connected to the appropriate data line of the A bus 19, and its output is connected to the input of an inverter 41. The control input of the gate 40 is connected to the output of an AND gate 49, whose inputs are a phase ($\phi$)1 signal line from the clock 16 (see FIG. 1) and an RCL (receive lower) control line from the microcode memory 18. Thus the gate 40 is enabled only while the clock 16 is generating a $\phi$1 output and the controller 17 is causing the microcode memory 18 to assert the RCL line. The transmission gate 40 then latches its output to the state appearing at its input.

Assuming that the bit position shown in FIG. 3 is of the register and comparator 34, a bit position of the register and comparator 35 would have a different control input RCU (receive upper), to the gate 49 from the microcode memory 18, to allow the two registers and comparators 34 and 35 to be loaded at different times.

The output of the inverter 41 is connected to an input of an AND gate 47 and to the input of an inverter 42. The output of the inverter 42 is connected to an input of an AND gate 45 and to the inputs of two MOS transmission gates 43 and 44. The output of the gate 43 feeds back into the input of the inverter 41. The control input of the gate 43 connects to a phase 2 ($\phi$2) signal line from the clock 16. A value that has been input through the gate 40 to the bit position shown in FIG. 3 passes through the inverters 41 and 42 to the input of the gate 43, passes to the output of the gate 43 upon assertion by the clock 16 of the $\phi$2 signal line, and thereafter circulates through the inverters 41 and 42 and the gate 43 on subsequent assertions of the $\phi$2 signal line, thus becoming stored in the bit position shown in FIG. 3.

The gate 44 is utilized for reading the bit value from the register and comparator 34 onto the A bus 19. The output of the gate 44 is connected to the same data line of the A bus 19 as the input to the gate 40. The control input of the gate 44 is connected to the output of an AND gate 50, whose inputs are the $\phi$1 signal line from the clock 16 and an RDL (read lower) control line from the microcode memory 18.

While the above described implementation of the register portions of the registers and comparators 34, 35 is based on MOS charge storage technology, other implementations could be made in bipolar technology, for example.

When the controller 17 wishes to read out the contents of the register and controller 34, for example during a context switch for the purpose of storing the contents in the process status word of a currently executing process, it causes the microcode memory 18 to assert the RDL line. When the clock 16 generates the next $\phi$1 signal, the output of the gate 50 goes high, the gate 44 is enabled, and the contents of the bit position of FIG. 3 are read out onto the associated data line of the A bus 19. Again, a bit position of the register and comparator 35 would have a different control input, RDU (read upper), to the gate 50 from the microcode memory 18, to allow the two registers and comparators 34 and 35 to be read out at different times.

The AND gate 45 has a second input connected to a data line of the B bus 20, which data line corresponds in bit position to the data line of the A bus 19 connected to the gate 40. A third input of the AND gate is connected to a BORROW line from the less significant bit position of the register and comparator 34 or 35 which lies directly adjacent the bit position of FIG. 3. Comparison between the contents of a bit position and the contents of the associated data line of the B bus 20 is substantially a process of subtracting the contents of the B bus 20 from the stored value, and hence a borrow is generated whenever the subtrahend is larger than the minuend. At the least significant bit position of the registers and comparators 34 and 35, the BORROW line input is simply clamped low.

The associated data line of the B bus 20 and the BORROW line input from the less significant bit position also form inputs to an OR gate 46. Output of the OR gate 46 forms one input to an AND gate 47, whose other input is formed by the output of the inverter 41. The output of the gate 47 is connected to one input of an OR gate 48. The output of the gate 45 is connected to another input of the gate 48. The output of the gate 48 is the BORROW input to the more significant bit position of the register and comparator 34 or 35 which lies directly adjacent the bit position of FIG. 3. The circuit just described is basically a one bit full subtractor without circuitry for computing a difference.

The BORROW output of the most significant bit of each of the registers and comparators 34 and 35 forms an input to the error circuit 36. The output of either most significant bit is high when the value appearing on the data lines of the B bus 20 is greater than the value stored in the associated register and comparator 34, 35.

Figure 4:
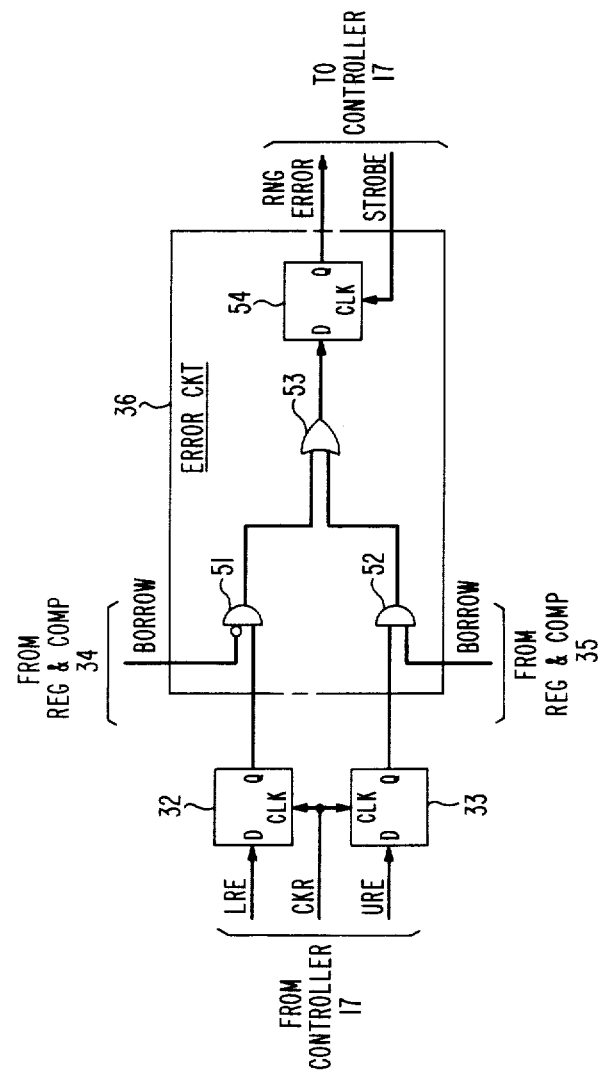
FIG. 4 is a logic diagram of flags and of the error circuit of FIG. 2.

Turning now to FIG. 4, there is shown the logic diagram of the error circuit 36 and of the flag bits 32 and 33. Each of the flag bits 32 and 33 is a D type flip-flop. The D input to the flag bit 32 is an LRE (lower range enable) control line from the controller 17, which is asserted high by the controller 17 when it wishes to enable a check of a value against the lower limit of a range. Similarly, the D input to the flag bit 33 is a URE (upper range enable) control line from the controller 17, which is asserted high when the controller 17 wishes to enable a check of a value against the upper limit of a range. The clock control input of the flag bits 32 and 33 is connected to a CKR (check range) input line from the controller 17, which is asserted high by the controller 17 whenever a range check of any type is to be performed. On the assertion of the CKR line, the flag bits 32 and 33 latch the states appearing at their D inputs to their Q outputs.

The Q output of the bit 32 forms an input to an AND gate 51. The BORROW output of the register and comparator 34 is connected to an inverted input of the gate 51. The Q output of the bit 33 and the BORROW output of the register and comparator 35 form inputs to an AND gate 52. Thus the output of the gate 51 is high when a check against the lower range limit has been enabled and the value being checked lies below that limit, and the output of the gate 52 is high when a check against the upper range limit has been enabled and the value being checked lies above that limit.

The output of the gates 51 and 52 are logically ORed by a gate 53, whose output forms the D input of a D flip-flop 54. The Q output of the flip-flop 54 is connected to a RNGERROR line leading to the controller 17. The clock control input of the flip-flop 54 is connected to a STROBE line leading from the controller 17. When the controller 17 wishes to check whether a range error has occurred, it asserts the STROBE line high. This causes the flip-flop 54 to latch its Q output to the signal level appearing at its D input. The controller 17 then tests the state of the RNGERROR line to determine the presence or absence of range error.

Controller

Figure 5A:
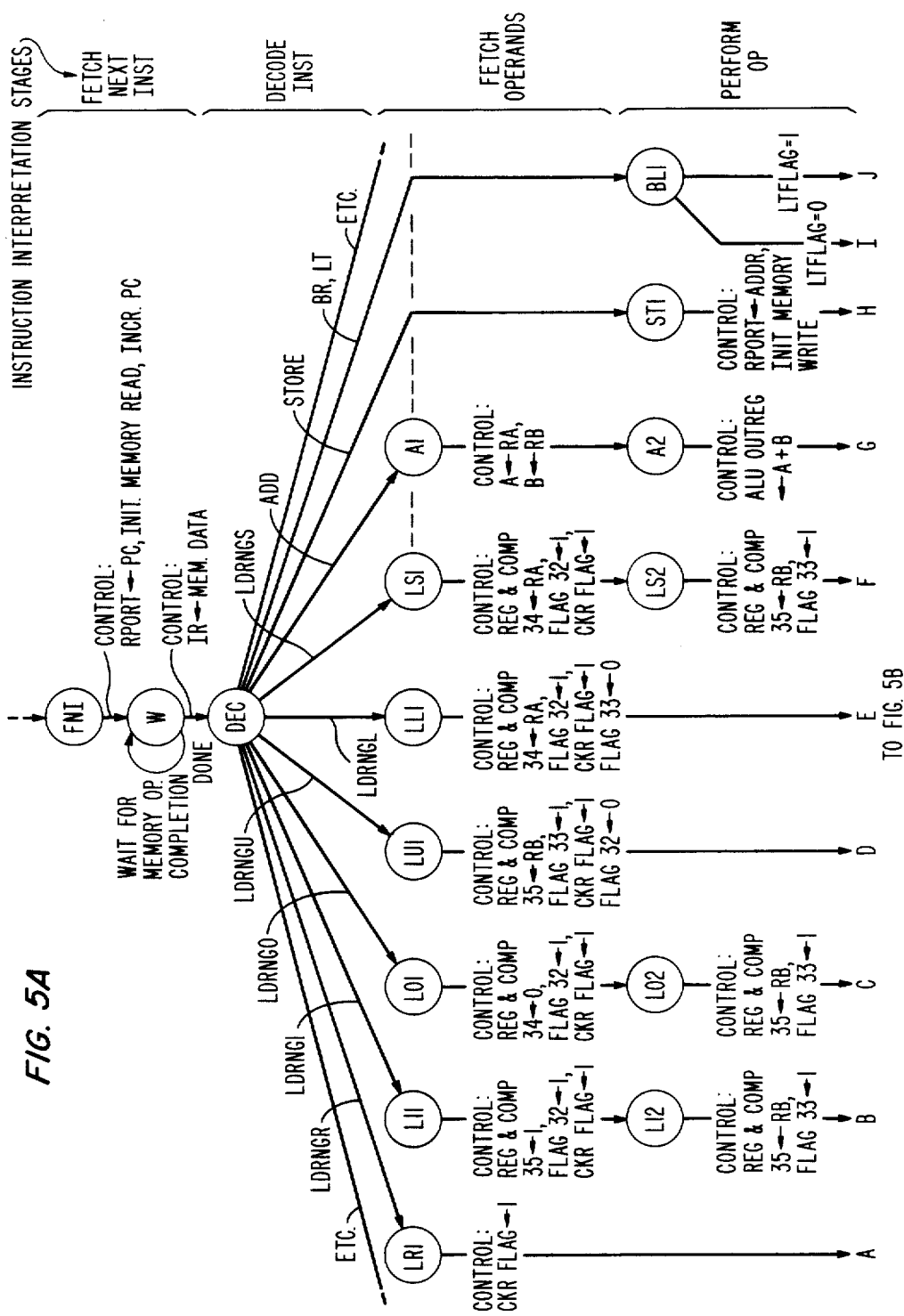

Turning now to FIGS. 5A–5C, there is shown a portion of the state diagram that characterizes the controller 17 of the control unit 42. The controller 17 is comprised of an OM2 controller circuit, which is described at some length in Ch. 6 of Mead and Conway, supra. Also, the OM2 controller circuit follows the stored-program, sequential-instruction, fetch-execute concepts of most present general purpose computers. Therefore substantially only that portion of its design which is affected by the present invention is shown in FIGS. 5A–5C and discussed below.

As shown in FIGS. 5A–5C along the right hand side, the controller 17 typically goes through stages in the interpretation of program instructions. The conventional stages are defined by Mead and Conway, supra, on p. 195 as follows:

1. Fetch next instruction. (FNI) This is the starting point of the fetch-execute sequence. The machine instruction at the address contained in the program counter is fetched from the memory into the instruction register.

2. Decode Instruction. As a function of the fetched machine instruction's type, encoded in its OP code field, the controller must branch to the proper next control state to begin execution of the operations specific to that particular instruction type.

3. Fetch instruction operands. Instructions may specify operands such as the contents of registers or of memory locations. During this execution stage, the controller cycles through a sequence of states outputting control sequences to fetch the specified operands into specified locations; for example, into the input register of the ALU.

4. Perform Operation. The operation specified by the OP code is performed upon the operands.

5. Store Result(s). The results of the operation are stored in destinations, such as in registers, memory locations, flags.

6. Set up next address, and return to FNI. Most instructions increment the program counter by one and return to the FNI state (1). Branch instructions may modify the program counter, perhaps as a function of flags, by replacing its contents with a literal value, fetched value, or computed value.

To these six stages the present invention adds a seventh stage: check range. As shown in FIG. 5B, this stage is traversed by the controller 17 between the "perform operation" (see FIG. 5A) and "store result(s)" (see FIG. 5C) stages. When the operation is performed, that is, when an instruction is executed to the point that a value resulting from that operation has been obtained, the controller 17 branches in accordance with whether or not a range check is to be performed. If no range check is to be performed, the execution of the instruction is resumed and continues in the traditional manner, that is, the "store result" stage is traversed by the controller 17. If a range check is to be performed, the controller 17 enters a range checking microsubroutine RCMS. If the controller 17 finds no range error, it returns to the "store result" state, i.e. resumes the normal execution of the instruction. If the controller 17 finds a range error, it branches to the "compute next address" stage and jumps to an exception handling micro-subroutine. A micro-subroutine is a subroutine encoded in microcode. It is stored in the microcode memory 18. The above summary of the operation of the controller 17 is expanded upon further below.

In order to instruct the controller 17 that a range check is to be performed, a new type of instruction, referred to herein as a prefix LDRNG ("load range"), is added to the instruction set of the processor 10. The prefix type LDRNG may be a single basic instruction that instructs the controller 17 to cause a value to be checked against an upper and a lower limit of a range of values. This basic prefix is designated in FIG. 5A as LDRNGS.

The prefix will generally be of the type LDRNGS,X,Y, where X and Y designate the operands, which are the lower and upper limits, respectively, of the range to checked. In the example of FIG. 5C, the prefix shown is of the type LDRNGS,RA,RB, indicating that the lower limit is to be found in a register A of the registers unit 25 (see FIG. 2), and that the upper limit is to be found in a register B of the unit 25. However, the values of the range limits could just as easily have been specified in an immediate addressing mode. Or the limits could have been stored in the main memory unit 13 (see FIG. 1), in which case the designations of registers A and B would have been replaced with the addresses of locations of the limits in the main memory unit 13. Moreover, these addresses could take on any desired form, for example indirect or offset. The fact that the processor 10 allows a plurality of operand modes to be used does not affect the range checking mechanism described here. In the present example the only limitation imposed is that the result of the operand fetch be available as a one word-width quantity on the A bus 19.

The prefix type LDRNG may also comprise a series of specialized prefixes in addition to the basic LDRNGS prefix. Some of the specialized LDRNG prefixes possible are indicated in FIG. 5A. LDRNGL instructs the controller 17 to cause a value to be checked against a lower limit only, while a LDRNGU causes a value to be checked against an upper limit only. LDRNG0 and LDRNG1 instruct the controller 17 to set the lower limit of a range to 0 or to 1, respectively, and to then cause a value to be checked against both the upper and lower limit. All four of these specialized LDRNG prefixes avoid the overhead of having to fetch a limit that need not be fetched. A fifth specialized LDRNG prefix shown in FIG. 5A, LDRNGR, instructs the controller 17 to repeat the range limits, that is, to reuse the previously fetched limits during the next range check and to repeat the previous type of range check. Thus it eliminates the overhead of specifying and fetching the same limits over and over again.

In the machine language program, the LDRNG prefix is placed by the programmer or by the compiler immediately preceding the instruction, referred to herein as the primary instruction, that obtains the value which it is desired to check against the range limits. The primary instruction may be any suitable instruction, for example the ADD instruction or the STORE instruction of FIG. 5A.

Conversely, a BRANCH instruction often does not produce a value to be checked against a range, and therefore a LDRNG instruction generally would not be used with such a primary instruction, and if used, could for example be ignored by the controller 17.

As the LDRNG prefix precedes the primary instruction, it is fetched and decoded by the controller 17 before the primary instruction. As shown in FIG. 5A, the controller 17 starts in the "fetch next instruction" state (FNI). It fetches the instruction and enters the "decode instruction" state. Upon decoding the instruction and discovering that it is a LDRNG prefix, the controller 17 branches to the proper next control state to begin execution of the operations specified by that prefix, just as other instructions cause it to jump to the appropriate microcode sequence.

In the case of the LDRNGS prefix, the controller 17 branches to the LS1 state in the "fetch operands" stage. The controller 17 evaluates the two operands associated with the LDRNGS prefix, taking the first operand to be the lower limit and the second operand to be the upper limit. The controller 17 causes control signals to be output by the microcode memory 18 of the control unit 12 which cause the lower limit of a range of values to be fetched, in this example from the register A of the register unit 25, and to be loaded into the register and comparator 34. At that time, the controller 17 also asserts the CKR line to the flag bits 32 and 33 (see FIG. 4), sets an internal CKR flag (not shown) which corresponds to the state of the CKR line, and asserts the LRE line to the flag bit 32 (see FIG. 4). Because the CKR and LRE lines are high, the flag 32 is set, and thus a check of the lower limit against a value is enabled.

Because the registers and comparators 34, 35, must both be loaded over the A bus 19, only the register and comparator 34 is loaded during the "fetch operands" stage. Therefore, the controller 17 assumes the LS2 state and uses the "perform OP" stage to load the register and comparator 35 from the register B, in the same manner as the register and comparator 34 was loaded from the register A, and to set the flag bit 33 by asserting the URE line.

The controller then loops back to the "fetch next instruction" (FNI) stage (See FIG. 5C)

The LDRNG0 and LDRNG1 prefixes are executed by the controller 17 in a manner analogous to that of the LDRNGS prefix, with the exception that the controller 17 need not cause the lower limit of the range to be fetched. Rather, the controller 17 need only cause the contents of the A bus 19 to be set to 0 or 1, respectively, for example via the literal port 23, and to load these contents into the register and comparator 34.

In the case of the LDRNGL or LDRNGU prefix, the controller 17 merely fetches the one lower or upper limit, respectively, loads the one register and comparator 34 or 35, respectively, sets the CKR flag, and sets only one flag 32 or 33, respectively, while resetting the other flag 32 or 33. As only one register and comparator 34 or 35 need be loaded, the prefix is executed in the "fetch operands" stage, and the controller 17 loops therefrom to the FNI stage.

The LDRNGR prefix requires the controller 17 to fetch no operands at all. Rather, the controller 17 need only set the internal CKR flag and reassert the CKR line to the flags 32, 33. Then the controller 17 loops to the FNI stage.

Next, the controller 17 fetches the primary instruction, which directly follows the LDRNG prefix in the program. As shown in FIG. 5A, the controller 17 decodes that instruction and executes it through the "perform OP" stage in the conventional manner. In the case of instructions which do not produce a value to be checked against a range, such as the BRANCH instruction in FIG. 5A, the controller 17 may skip the "check range" stage and execute the whole instruction in the conventional manner. In the case of other instructions, such as the ADD and STORE instructions in FIG. 5A, after the "perform OP" stage the controller 17 enters the "check range" stage, depicted in FIG. 5B, and tests its internal CKR flag bit. After noting the state of the CKR flag bit and performing a branch in response thereto, the controller 17 resets the CKR flag to zero.

If the CKR flag was not set, meaning that the primary instruction was not preceded by a LDRNG prefix, the controller 17 does not perform a range check and skips down to the "store result" stage, shown in FIG. 5C, to continue executing the primary instruction in the conventional manner. If, however, the CKR flag bit was set, meaning that the primary instruction was immediately preceded by a LDRNG prefix, the controller 17 enters a range checking micro-subroutine RCMS.

In the micro-subroutine RCMS the controller 17 first enters the state RCMS1. It causes condition codes resulting from execution of the primary instruction to be stored in the flag register 24 (see FIG. 2) and causes the value that is to be range checked to be loaded onto the B bus 20. Turning to FIG. 3, the registers and controllers 34 and 35 automatically cause the contents of the B bus to be compared against their contents, and output the results of the comparison onto the BORROW lines to the error circuit 36. Turning to FIG. 4, the status of the flags 32 and 33 determines whether the results of only one or both comparisons will be considered in determining a range error. If only the result of one comparison is considered, the result of the second comparison becomes irrelevant, and thus the value will essentially have been checked against one limit of the range only. The result of the desired range check is then input to the flip-flop 54.

Returning now to FIG. 5B, the controller 17 next enters the state RCMS2 and asserts the STROBE line to the flip-flop 54 to cause the result of the range check to appear on the RNGERROR line.

The controller 17 assumes the state RCMS 3 and tests the RNGERROR line. If the line is low, indicating that the checked value lies within the allowed range and that no range error has occurred, the controller 17 branches back to the "store result" stage and continues executing the primary instruction in the conventional manner. If, however, the RNGERROR line is high, indicating that the checked value lies outside of its allowed range, the controller 17 branches to the "compute next instruction address" stage, depicted in FIG. 5C, and jumps to an exception handling micro-subroutine. This micro-subroutine determines the location of exception handling software which is provided by the user within the system 10, and transfers control to that software.

The exception is a disruption, an error, in the normal execution of an instruction resulting from internal conditions. It is akin to an interrupt, which is a disruption generated externally to the processor.

Compiler

Range checking capabilities of modern languages require and find support in the language compilers. The compilers keep track of the acceptable range for each variable. The compilers may determine at translation time any statements that will definitely generate range errors, and likewise the compilers may perform analysis to determine that some statements cannot possibly cause range violations. For these classes of statements, capability to perform range checking during program execution is not required. But for those statements which may result in range violations during program execution, the compiler must generate code to check the validity of a value with respect to the range prior to storing the result of the statement. At program execution time, software must also be supplied and loaded into the computer to receive control if and when an exception occurs, i.e., if an out-of-range value is indicated. As was mentioned previously, these requirements complicate the structure and operation of the compilers.

The present invention substantially impacts the above-mentioned area of range checking code generation. The present invention significantly simplifies this phase of compiler operation. A comparison of compiler logic with and without the present invention is made in FIG. 6.

Figure 6:
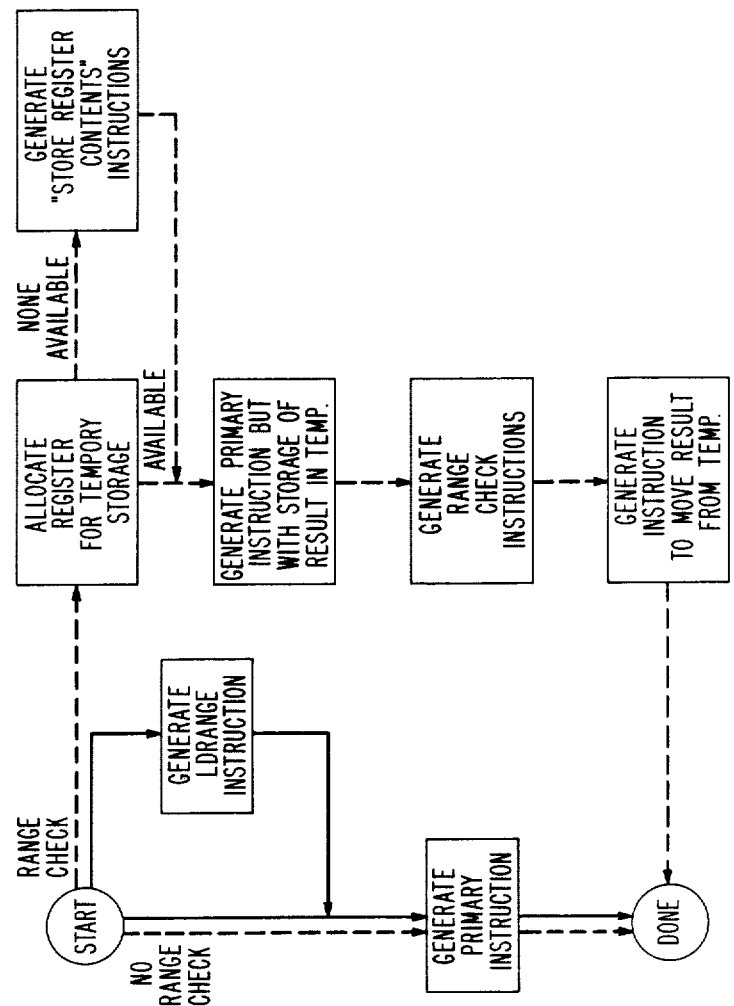
FIG. 6 is a flowchart of a portion of a compiler for the system of FIG. 1 contrasted with a compiler for a conventional system.

As shown by dashed lines in FIG. 6, in prior art systems the code generated by a compiler for a statement not requiring a range check differs radically from code generated for the same statement requiring a range check. This is due in to the fact that when a range check is enabled, a temporary location must be allocated, the primary instruction whose results are to be checked against the range must be modified to store the result in the temporary location, the range checking must be executed, and the result—if it lies within the range—then must be moved from the temporary storage to its permanent storage location.

Additionally, since most compilers attempt to optimize the use of a limited number of registers, such as the registers of the unit 25 in FIG. 2, much of the logic of the compilers is spent allocating and recovering registers, and the requirement in the prior art of allocating a temporary location to store the primary instruction's result aggravates this condition. In the case where all registers contain needed information, the impact of range checking in the prior art can be a severe performance penalty, as that information must be stored elsewhere, for example returned to main store, in order to free a register for the range checking operation.

In contrast with the prior art, the enablement or disablement of range checking in the present invention requires only the insertion or deletion of a prefix before the primary instruction, as shown in solid lines in FIG. 6. Thus this inventive range checking mechanism allows the compiler to use the same code generating logic whether or not a range check is enabled, thereby simplifying the compiler. Also, the need to alter the primary instruction is eliminated, which is important in that it allows the compiler to insert or remove the LDRNG prefix feely, depending on the degree of security desired, without affecting the normal operation of the program. And because no explicit allocation of a temporary storage location is required, the overhead associated therewith is eliminated, plus the program code is made simpler and more compact.

Furthermore, the range checking scheme described herein holds additional advantage for languages such as ADA that allow programmers to specify the ranges not only of integers but also of floating point quantities. If the floating point numbers are represented in a biased exponent format, such as the format of the proposed IEEE 754 standard described in "A Proposed Standard for Binary Floating—Point Arithmetic," *Computer*, p. 51 (March 1981), then the same hardware described above will also support the comparison of normalized single precision floating point numbers.

Of course, it should be understood that various changes and modifications to the illustrative embodiment described above will be apparent to those skilled in the art. For example, the upper limit and lower limit check enabling flags may be incorporated into the controller, and the third check enabling flag may be eliminated. Additionally, on heavily pipelined machines, the registers/comparators may be incorporated into a stage of the pipeline between the output of the ALU and a port on the main memory. Or the comparison of the value being range checked against one or both of the range limits may be made by the ALU, as opposed to being made by a dedicated comparator. The comparisons may be done sequentially as opposed to being done simultaneously. Furthermore, the values of the range limits may be held in registers of the processor's register unit, as opposed to being held in special additional registers, or the limits may merely be brought in on the processor's buses without being stored in the processor at all. Additionally, the system may be adapted to extend range checking capabilities to checking for out of bounds addresses and array subscripts. These and other changes and modifications can be made without departing from the spirit and scope of the invention and without diminishing its attendant advantages. It is therefore intended that such changes and modifications be covered by the following claims.

What is claimed is:

1. A method of performing range checks of values in a programmable system, comprising the steps of:
    enabling the system for checking a value against at least one limit of a range of values, by executing a first instruction;
    obtaining the value, by executing in part a second instruction subsequent to executing the first instruction;
    comparing the value with the at least one limit during execution of the second instruction; and
    generating an indication during execution of the second instruction when the value lies outside of the range.

2. The method of claim 1 further comprising the step of:
    continuing execution of the second instruction when the value lies within the range.

3. A method of performing range checks of values in a programmable system, comprising the steps of:
    selectively providing the system with a first instruction;
    enabling the system for checking a value against at least one limit of a range of values, by executing the first instruction;
    obtaining the value, by partly executing a second instruction after executing the first instruction;
    comparing the value with the at least one limit during execution of the second instruction, when the system is enabled for the checking; and
    generating an indication during execution of the second instruction when the value lies outside of the range and the system is enabled for the checking.

4. The method of claim 3 wherein the step of obtaining the value is followed by the step of continuing execution of the second instruction when the system is not enabled for the checking.

5. The method of claim 3 wherein the step of comparing the value with the at least one limit is followed by the step of continuing execution of the second instruction when the value lies within the range.

6. The method of claim 1 or 3 wherein the step of obtaining the value is followed by the step of determining whether the system has been enabled for the checking.

7. The method of claim 6 in a programmable system further including flag means, wherein the step of enabling the system for checking comprises the step of setting the flag means, and wherein the step of determining comprises the step of testing the flag means.

8. The method of claim 1 or 3 wherein the step of generating an indication is followed by the steps of:
    intercepting execution of the second instruction; and
    transferring execution to error handling means.

9. The method of claim 2 or 4 or 5 wherein the step of continuing execution comprises the step of:
    storing the value in means specified by the second instruction.

10. A method of performing a range check of a value in a programmable system which includes first, second, and third flag means, the method comprising the steps of:
    (1) obtaining at least one of a lower limit and an upper limit of a range of values by executing a first instruction;
    (2) setting at least the third flag means of the first, second, and third flag means, by executing the first instruction;
    (3) obtaining a value specified by a second instruction, by partly executing the second instruction directly following execution of the first instruction;
    (4) comparing the value with at least one of the lower and the upper limit during execution of the second instruction;
    (5) signaling during execution of the second instruction when both the value is exceeded by the lower limit and the first flag means are set;
    (6) signaling during execution of the second instruction when both the value exceeds the upper limit and the second flag means are set;
    (7) testing for signaling during execution of the second instruction when the third flag means are set;
    (8) continuing execution of the second instruction when the testing indicates no signaling; and
    (9) discontinuing execution of the second instruction when the testing indicates signaling.

11. The method of claim 10 further comprising the step of:
    (10) transferring execution to error handling means when the testing indicates signaling.

12. The method of claim 10 in a programmable system further including processor means for executing instructions and storage means included in the processor means, wherein the step of obtaining at least one limit comprises the steps of:
    fetching the at least one limit; and
    storing the at least one limit in the storage means.

13. The method of claim 10 wherein the step of obtaining a value comprises the step of:
   performing operations specified by the second instruction.

14. The method of claim 13 wherein the step of continuing execution comprises the step of:
   storing the result of the performed operation in means specified by the second instruction.

15. The method of claim 10 wherein the step of continuing execution comprises the step of:
   storing the value in means specified by the second instruction.

16. The method of claim 10 wherein the step of testing for signaling is followed by the step of:
   clearing the third flag means.

17. The method of claim 16 further comprising the steps of:
   (11) setting the third flag means by executing a third instruction subsequent to execution of the second instruction;
   (12) obtaining a second value specified by a fourth instruction, by partly executing the fourth instruction directly following execution of the third instruction;
   (13) comparing the second value with at least the one of the lower and the upper limit during execution of the fourth instruction;
   (14) signaling during execution of the fourth instruction when both the second value is exceeded by the lower limit and the first flag means are set;
   (15) signaling during execution of the fourth instruction when both the second value exceeds the upper limit and the second flag means are set;
   (16) testing for signaling during execution of the second instruction when the third flag means are set;
   (17) continuing execution of the fourth instruction when the testing indicates no signaling;
   (18) discontinuing execution of the fourth instruction when the testing indicates signaling.

18. A programmable system comprising:
   means responsive to execution of a first instruction for enabling the system to check a value against at least one limit of a range of values;
   instruction executing means for obtaining the value, by executing in part a second instruction subsequent to execution of the first instruction;
   means for comparing the value with the at least one limit during execution of the second instruction; and
   means responsive to the comparing means and to the enabling means for generating during execution of the second instruction an indication when the value lies outside of the range and the system is enabled to check the value against a limit of the range.

19. A programmable system comprising:
   instruction executing means for executing a first instruction and for obtaining a value by partly executing a second instruction;
   means responsive to the execution of the first instruction preceding execution of the second instruction for enabling the system to check during execution of the second instruction the value against at least one limit of a range of values;
   means for comparing the value with the at least one limit during execution of the second instruction; and
   means responsive to the comparing means and to the enabling means for generating an indication during execution of the second instruction when both the value lies outside of the range and the system is enabled to check the value against a limit of the range.

20. The system of claim 18 or 19 further comprising:
   means responsive to the indication generating means for causing the executing means to continue execution of the second instruction when the indication is not generated.

21. The system of claim 19 further comprising:
   means responsive to the enabling means for causing the instruction executing means to continue execution of the second instruction when the system is not enabled to check the value against a limit of the range.

22. The system of claim 18 or 19 further comprising:
   error handling means;
   means responsive to generation of the indication by the indication generating means for causing the instruction executing means to interrupt execution of the second instruction and for activating the error handling means.

23. The system of claim 18 or 19 further comprising flag means, and wherein the enabling means comprise means for setting the flag means.

24. The system of claim 20 further comprising storage means specified by the second instruction, and wherein the means for causing the instruction executing means to continue execution comprise:
   means for causing the instruction executing means to store the value in the storage means.

25. A programmable system comprising:
   storage means for storing as their contents upper and lower limits of a range of values;
   settable flag means;
   instruction execution means for executing instructions;
   means responsive to execution of a first instruction by the instruction execution means for selectively storing the upper and lower limits in the storage means and for selectively setting the flag means;
   means for generating a value in response to partial execution by the instruction execution means of a second instruction subsequent to the execution of the first instruction;
   means responsive to the means for generating a value, for comparing the value with the contents of the storage means and for generating a range check signal indicating results of the comparison, during execution of the second instruction; and
   means responsive during execution of the second instruction to the range check signal and to the flag means for controlling further execution of the second instruction by the execution means.

26. The system of claim 25 wherein:
   the storage means comprise first storage means for storing the lower limit and second storage means for storing the upper limit;
   the flag means comprise first, second, and third settable flag means;
   the comparing means comprise both first means for comparing the value with the contents of the first storage means and for generating a first range check signal when both the value is exceeded by the contents and the first flag means are set, and second means for comparing the value with the contents of the second storage means and for generating a second range check signal when both the value exceeds the contents and the second flag means are set; and the means for controlling further execution include means, responsive to the first and the second range check signals when the third flag means are set, for causing the execution means to continue execution of the second instruction when neither the first nor the second range check signal has been generated, and for causing the execution means to interrupt execution of the second instruction when at least one of the first and the second range check signals has been generated.

27. The system of claim 26 wherein the selective storing and setting means are adapted to store the lower limit and to set the first and third flag means in response to the execution of the first instruction.

28. The system of claim 26 wherein the selective storing and setting means are adapted to store the upper limit and to set the second and third flag means in response to the execution of the first instruction.

29. The system of claim 26 wherein the selective storing and setting means are adapted to store the upper and lower limits to set the first, second, and third flag means in response to the execution of the first instruction.

30. The system of claim 26 wherein the selective storing and setting means are adapted to set the third flag means in response to the execution of the first instruction.

* * * * *

UNITED STATES PATENT AND TRADEMARK OFFICE
CERTIFICATE OF CORRECTION

PATENT NO. : 4,542,456

DATED : September 17, 1985

INVENTOR(S) : Dwight D. Hill

It is certified that error appears in the above-identified patent and that said Letters Patent is hereby corrected as shown below:

In the Specification, Column 1, line 53, after "checks" delete "is" and substitute therefor --in--,
Column 6, line 1, after "to" delete "a" and substitute therefor --an--,
Column 9, line 28, after "to" insert --be--.

In the Claims, Column 14, claim 8, line 23, delete "intercepting" and substitute therefor --interrupting--,
Column 15, claim 13, line 3, delete "operations" and substitute therefor --operation--.

Signed and Sealed this

Fourteenth Day of January 1986

[SEAL]

Attest:

Attesting Officer

DONALD J. QUIGG

Commissioner of Patents and Trademarks